US012002442B2

(12) United States Patent
Lee et al.

(10) Patent No.: US 12,002,442 B2
(45) Date of Patent: Jun. 4, 2024

(54) METHOD AND DEVICE FOR PERSONALIZED SOUND MASKING IN VEHICLE

(71) Applicants: HYUNDAI MOTOR COMPANY, Seoul (KR); Kia Corporation, Seoul (KR)

(72) Inventors: Myoung Ok Lee, Seoul (KR); Jung Keun You, Suwon-si (KR); Mun Hwan Cho, Seoul (KR); Kaang Dok Yee, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 183 days.

(21) Appl. No.: 17/878,586

(22) Filed: Aug. 1, 2022

(65) Prior Publication Data

US 2023/0178061 A1 Jun. 8, 2023

(30) Foreign Application Priority Data

Dec. 8, 2021 (KR) .......................... 10-2021-0174408

(51) Int. Cl.
*G10K 11/175* (2006.01)
*G10L 25/18* (2013.01)
*G10L 25/30* (2013.01)
*H04R 1/02* (2006.01)

(52) U.S. Cl.
CPC .......... *G10K 11/1754* (2020.05); *G10L 25/18* (2013.01); *G10L 25/30* (2013.01); *H04R 1/025* (2013.01); *H04R 2499/13* (2013.01)

(58) Field of Classification Search
CPC ..... G10K 11/1754; G10L 25/18; G10L 25/30; H04R 1/025; H04R 2499/13
See application file for complete search history.

(56) References Cited

U.S. PATENT DOCUMENTS

| 10,629,182 | B1 * | 4/2020 | Layton | H03G 3/32 |
| 2007/0055513 | A1 * | 3/2007 | Hwang | H04K 1/06 |
| | | | | 704/E21.006 |
| 2015/0137998 | A1 * | 5/2015 | Marti | H04K 3/45 |
| | | | | 340/901 |
| 2018/0166061 | A1 * | 6/2018 | Kotegawa | G10K 11/1752 |
| 2018/0268836 | A1 * | 9/2018 | Krasnov | G10L 21/16 |
| 2019/0130887 | A1 * | 5/2019 | Kotegawa | H04R 3/12 |
| 2019/0228757 | A1 * | 7/2019 | Chwioko | G10K 11/1754 |

(Continued)

FOREIGN PATENT DOCUMENTS

| CN | 110520323 A | * 11/2019 | ............. B60K 37/06 |
| CN | 111883166 A | * 11/2020 | ......... G10L 21/0216 |

(Continued)

*Primary Examiner* — David L Ton
(74) *Attorney, Agent, or Firm* — Morgan, Lewis & Bockius LLP

(57) ABSTRACT

The present disclosure provides a computer-implemented method for sound masking. The method includes identifying one class among a plurality of classes based on frequency characteristics of a voice of a first occupant in a vehicle, obtaining reference voice data corresponding to the identified class, generating a personalized masking sound for the first occupant by synthesizing the reference voice data with white noise, and controlling an output of the personalized masking sound.

15 Claims, 7 Drawing Sheets

(56) References Cited

U.S. PATENT DOCUMENTS

| | | | |
|---|---|---|---|
| 2019/0378529 A1* | 12/2019 | Li | G10L 25/30 |
| 2020/0015029 A1* | 1/2020 | Koyama | H04S 7/305 |
| 2022/0036895 A1* | 2/2022 | Kim | G10L 15/22 |
| 2022/0159403 A1* | 5/2022 | Sporer | H04R 3/005 |

FOREIGN PATENT DOCUMENTS

| | | | |
|---|---|---|---|
| CN | 112562664 A | * | 3/2021 |
| CN | 113707156 A | * | 11/2021 |
| JP | 2005343401 A | * | 12/2005 |
| JP | 2019120828 A | * | 7/2019 |
| JP | 2020203643 A | * | 12/2020 |

* cited by examiner

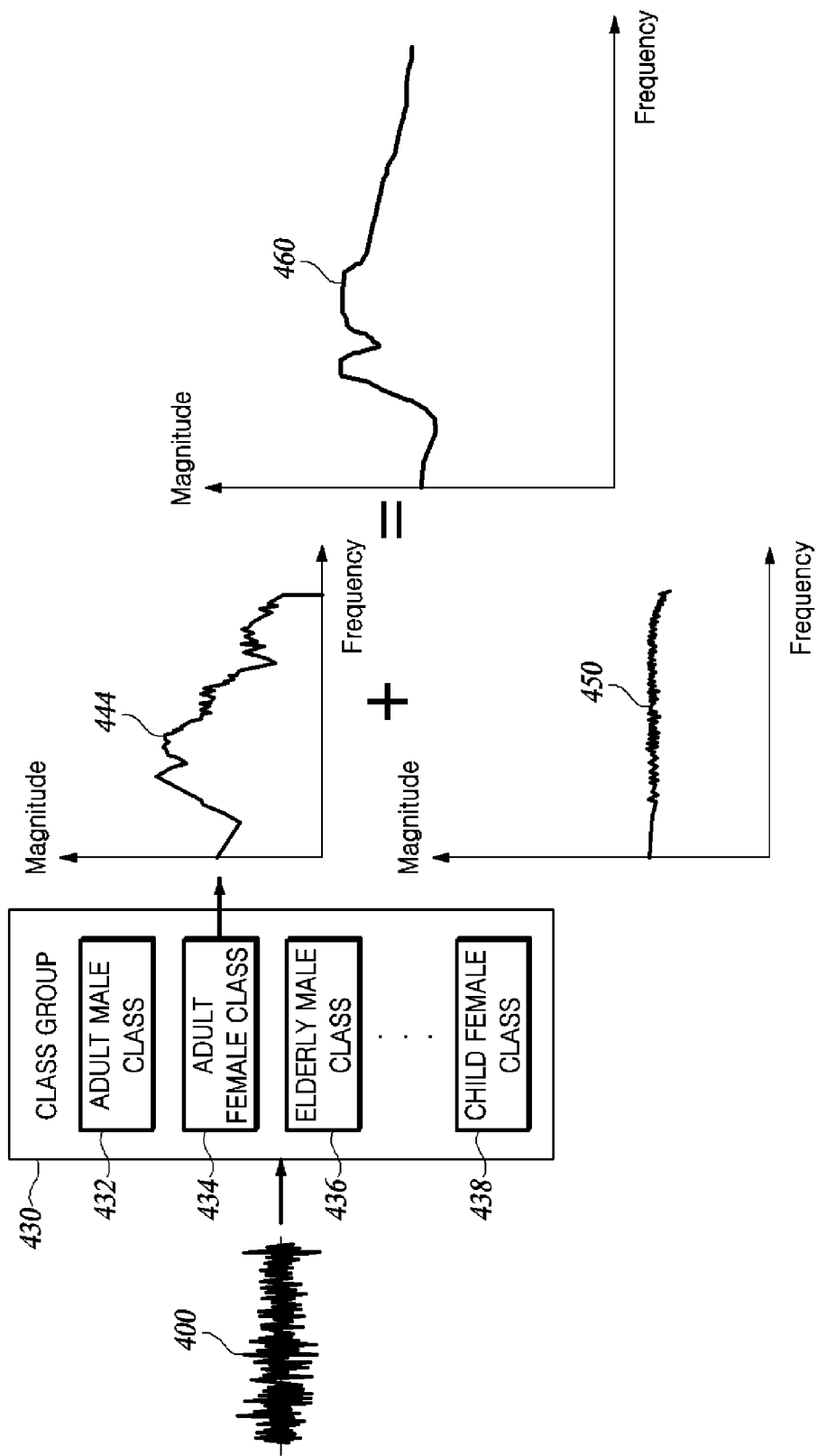

METHOD AND DEVICE FOR PERSONALIZED SOUND MASKING IN VEHICLE

CROSS-REFERENCE TO RELATED APPLICATION

This application claims priority to and the benefit of Korean Patent Application No. 10-2021-0174408, filed on Dec. 8, 2021, the disclosure of which is incorporated herein by reference in its entirety.

TECHNICAL FIELD

The present disclosure relates to a method and device for sound masking in vehicle.

BACKGROUND

The contents described in this part simply provide background information about the present disclosure and do not constitute the prior art.

Recently, a vehicle provides various and complex functions such as a navigation function, a telephone function, an audio function, and a radio function.

The functions required by a driver or an occupant in the vehicle become increasingly complex. For example, among the occupants in the vehicle, the driver may want to receive voice guidance on the navigation, and the occupant may want to listen to music. In addition, while making a call through a Bluetooth connection inside the vehicle, the driver may want the occupant not to hear the call for privacy.

According to this demand, research on sound masking technology has been actively conducted. The sound masking is a technology that allows occupants to recognize less surrounding noise by generating masking sound which is an artificial sound such as white noise.

However, when a person is continuously exposed to the masking sound, cognitive or psychological fatigue may accumulate. In addition, uniformly outputting the masking sound has limitations in masking various surrounding noises.

SUMMARY

According to at least one aspect, the present disclosure provides a computer-implemented method for sound masking. The method comprises identifying, by a controller, one class among a plurality of classes based on frequency characteristics of a voice of a first occupant in a vehicle; obtaining, by the controller, reference voice data corresponding to the identified class; generating, by the controller, a personalized masking sound for the first occupant by synthesizing the reference voice data with white noise; and controlling, by the controller, an output of the personalized masking sound.

According to at least another aspect, the present disclosure provides a sound masking device. The sound masking device comprises a microphone configured to receive a voice of a first occupant in a vehicle; at least one speaker disposed in the vehicle; and a controller configured to identify one class among a plurality of classes based on frequency characteristics of the voice, obtain reference voice data corresponding to the identified class, generate a personalized masking sound for the first occupant by synthe- sizing the reference voice data with white noise, and control the at least one speaker to output the personalized masking sound.

BRIEF DESCRIPTION OF THE DRAWINGS

FIG. 4B is a diagram for explaining a process of generating a personalized masking sound according to one embodiment of the present disclosure.

DETAILED DESCRIPTION

Figure 1:
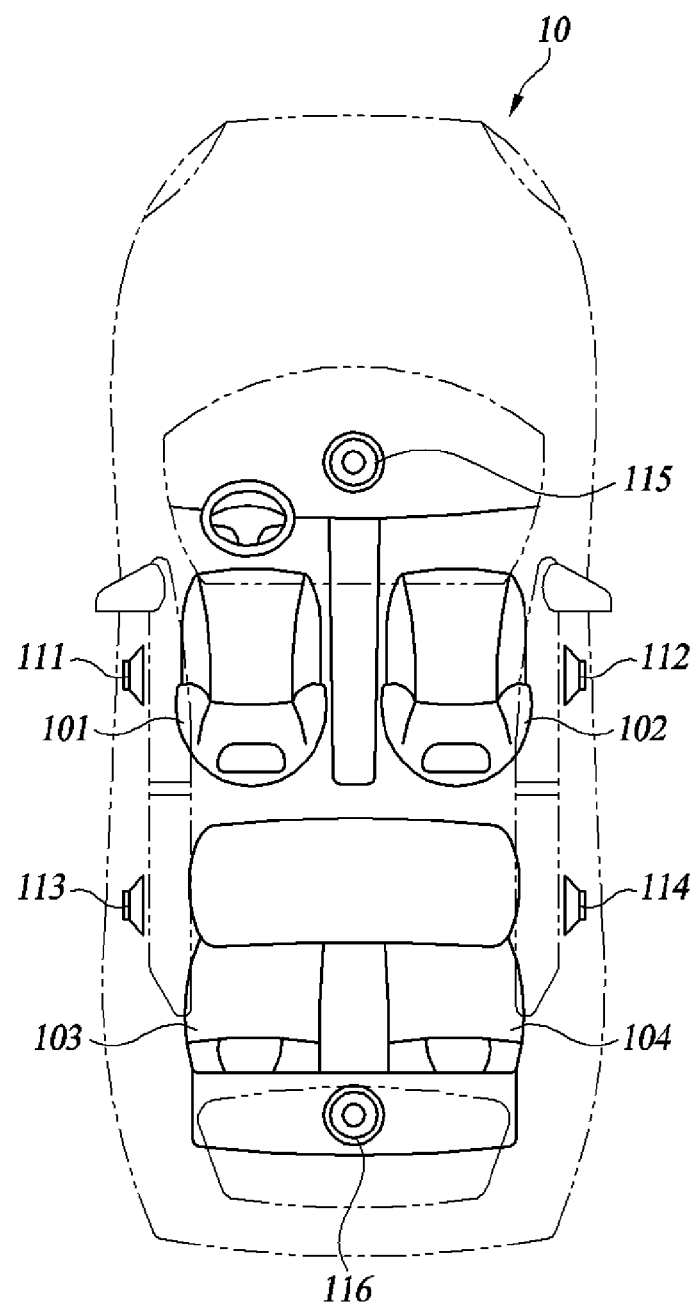
FIG. 1 is a diagram illustrating a plurality of speakers and seats inside a vehicle according to one embodiment of the present disclosure.

Hereinafter, some embodiments of the present disclosure will be described in detail with reference to exemplary drawings. With regard to the reference numerals of the components of the respective drawings, it should be noted that the same reference numerals are assigned to the same components even though they are shown in different drawings. In addition, in describing the present disclosure, a detailed description of a well-known configuration or function related to the present disclosure may be omitted if the description may obscure the subject matter of the present disclosure.

In addition, terms, such as "first", "second", "i)", "ii)", "a)", "b)", or the like, may be used in describing the components of the present disclosure. These terms are intended only for distinguishing a corresponding component from other components, and the nature, order, or sequence of the corresponding component is not limited by the terms. In the specification, when a unit 'includes' or 'is provided with' a certain component, it means that other components may be further included, without excluding other components, unless otherwise explicitly stated.

Each component of the device or method according to the present disclosure may be implemented as hardware or software, or a combination of hardware and software. In addition, the function of each component may be implemented as software and a microprocessor may execute the function of software corresponding to each component.

The present disclosure provides a method and device for classifying voices of occupants in a vehicle depending on frequency characteristics, and generating and outputting a personalized masking sound to the voice of an occupant to reduce cognitive or psychological fatigue which other occupants may feel due to the sound masking.

Further, the present disclosure provides a method and device for improving the performance of sound masking by classifying voices of occupants in a vehicle depending on frequency characteristics, and generating and outputting a personalized masking sound to an occupant's voice.

In addition, the present disclosure provides a method and device for preventing inaccurate masking sound from being output by accurately classifying voices of occupants using an artificial neural network when the voices of the occupants are input in real time.

FIG. 1 is a diagram illustrating a plurality of speakers and seats inside a vehicle according to one embodiment of the present disclosure.

Referring to FIG. 1, a vehicle 10 includes a plurality of seats 101, 102, 103 and 104 and a plurality of speakers 111, 112, 113, 114, 115 and 116 therein.

In FIG. 1, the vehicle 10 has a shape of a passenger car according to one embodiment. In another embodiment of the present disclosure, the vehicle 10 may have various shapes such as a bus, a truck, and a train.

In FIG. 1, locations and numbers of the plurality of speakers 111, 112, 113, 114, 115 and 116 and the plurality of seats 101, 102, 103 and 104 correspond to one embodiment. The plurality of speakers 111, 112, 113, 114, 115 and 116 and the plurality of seats 101, 102, 103 and 104 may be installed at any locations inside the vehicle 10, and the number thereof is not limited.

In FIG. 1, the plurality of speakers 111, 112, 113, 114, 115 and 116 are devices that output sound. The plurality of speakers 111, 112, 113, 114, 115 and 116 are provided in the vehicle 10. Specifically, a first speaker 111 is provided on a door for a first seat 101. A second speaker 112 is provided on a door for a second seat 102. A third speaker 113 is provided on a door for a third seat 103. A fourth speaker 114 is provided on a door for a fourth seat 104. A fifth speaker 115 is provided at a front position in the vehicle 10. A sixth speaker 116 is provided at a rear position in the vehicle 10.

The plurality of seats 101, 102, 103 and 104 are each seats on which an occupant seats. In addition to the plurality of speakers 111, 112, 113, 114, 115 and 116 shown in FIG. 1, headrest speakers or backrest speakers may be further included in headrests or backrests of the plurality of seats 101, 102, 103 and 104, respectively. The headrest speaker or the backrest speaker may more intensively output sound to a specific occupant than the plurality of speakers 111, 112, 113, 114, 115 and 116. The occupant may effectively listen to sound output from the headrest speaker or the backrest speaker.

The sound control device for controlling sound in the vehicle 10 generates control signals for sound output through the plurality of speakers 111, 112, 113, 114, 115 and 116. For example, the sound control device may generate a music playback signal, a video playback signal, a voice call signal, a navigation guide signal, and various warning signals. The plurality of speakers 111, 112, 113, 114, 115 and 116 may output sound inside the vehicle 10 based on the sound control signal. The sound control device corresponds to a sound masking device according to one embodiment of the present disclosure.

The plurality of speakers 111, 112, 113, 114, 115 and 116 may output sound inside the vehicle 10 by generating constructive interference or destructive interference to the sound signal in a low frequency band and the sound signal in a middle-high frequency band. That is, a sound may be output to some regions of the interior of the vehicle 10 depending on the number and arrangement of the plurality of speakers 111, 112, 113, 114, 115 and 116.

Figure 2:
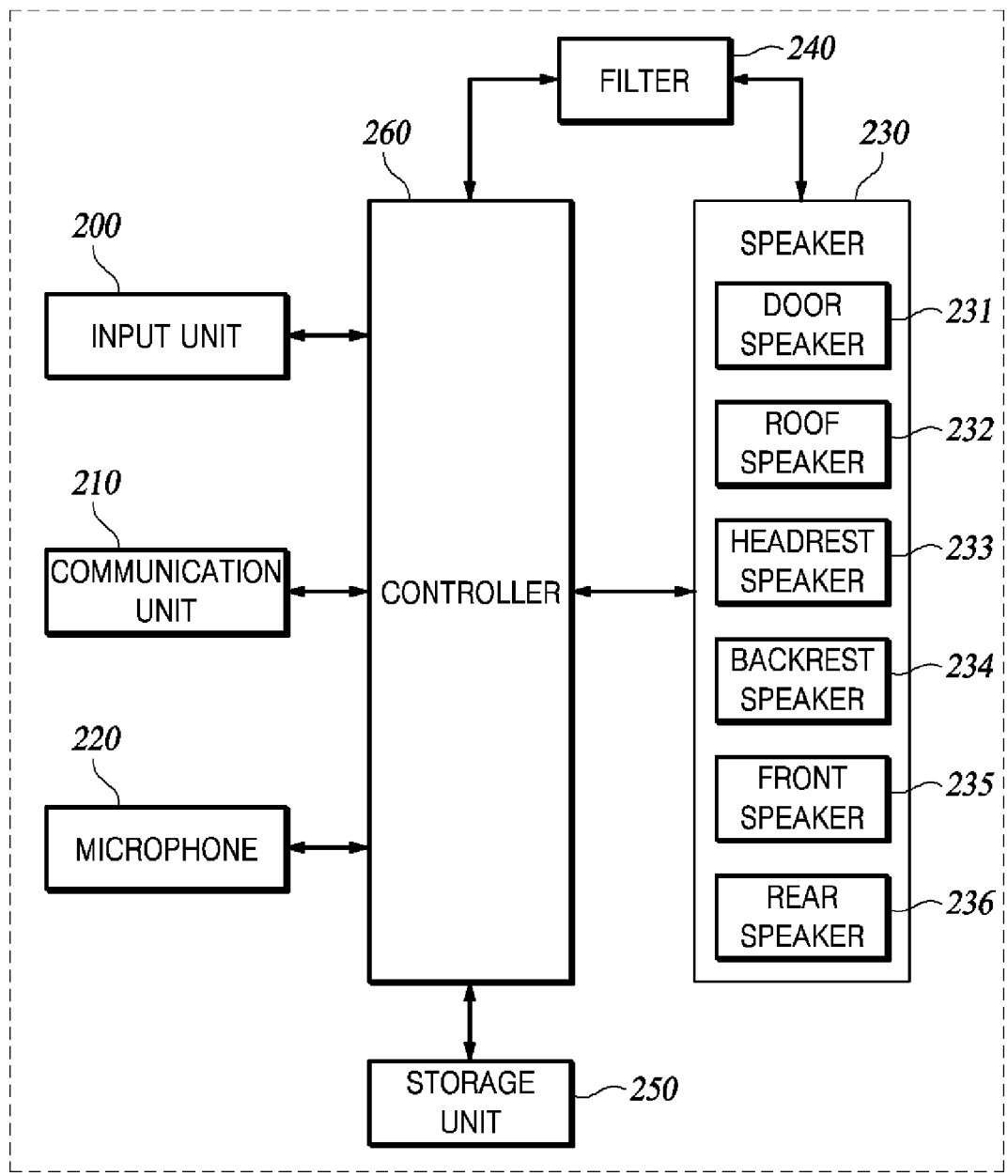
FIG. 2 is a block diagram of a sound control system according to one embodiment of the present disclosure.

FIG. 2 is a block diagram of a sound control system according to one embodiment of the present disclosure.

Referring to FIG. 2, the vehicle 20 includes at least one of an input unit 200, a communication unit 210, a microphone 220, a speaker 230, a filter 240, a storage unit 250, and a controller 260. The vehicle 20 may further include an amplifier for controlling the speaker 230. Each component may be a device or logic mounted in the vehicle 20.

The input unit 200 receives an input from an occupant in the vehicle 20. The input unit 200 may receive an input such as a voice or touch of the occupant. For example, the input unit 200 may receive an input command for a sound masking start from the occupant.

The communication unit 210 communicates with a device other than the vehicle 20. The communication unit 210 may communicate with a terminal of an occupant or an infrastructure around the vehicle 20.

The microphone 220 receives a voice of an occupant in the vehicle 20. The microphone 220 may further receive sound in the vehicle 20. In order to distinguish the occupant's voice from other sounds, the microphone 220 may perform filtering the received sound by itself.

The speaker 230 is a component which is provided in the vehicle 20 to output sound. The speaker 230 outputs sound based on the sound signal generated by the controller 260. For example, the speaker 230 may output a masking sound based on the masking sound signal of the controller 260.

The speaker 230 may be divided into a tweeter, a squawker, a woofer, and a sub-woofer according to a frequency band. The tweeter outputs sound in a treble high frequency band, the squawker outputs sound in a middle pitch frequency band, the woofer outputs sound in a bass frequency band, and the sub-woofer outputs sound in the ultra-bass frequency band.

The speaker 230 may be divided into a general type, a vibration type, and a film type. The general-type speaker means a general speaker. The vibration-type speaker is a speaker for generating vibration in a bass frequency band. The film-type speaker is a speaker that has a thin film shape and outputs sound through vibration of the film. In particular, the film-type speaker is small in size and it may be mainly used in a narrow space.

The speaker 230 may include at least one of a door speaker 211, a roof speaker 212, a headrest speaker 213, a backrest speaker 214, a front speaker 215, and a rear speaker 216.

The door speaker 211, the headrest speaker 213, the backrest speaker 214, the front speaker 215, and the rear speaker 216 are the same as those described with reference to FIG. 1.

The roof speaker 212 is a speaker disposed at a roof of the vehicle 20 to face the inside of the vehicle 20.

The roof speaker 212 may be linearly arranged, and the linear arrangement may have various angles with respect to the front of the vehicle 20. In addition, the roof speaker 212 may be disposed in an arrangement of two intersecting straight lines.

The roof speaker 212 may be a film-type speaker.

The vehicle 20 may provide more audio channels than the conventional vehicle through the roof speaker 212.

The filter 240 may filter sound signals output by each of the plurality of speakers 230 using a predetermined algorithm.

The filter 240 may be implemented as an algorithm in the form of a transfer function. By eliminating or passing a signal in a specific frequency band with respect to the sound signal generated by the controller 260, the filter 240 can allow the sound signals output from the plurality of speakers 230 to be output only to a specific region or cancel the sound signals output from the plurality of speakers 230 to the other region.

The storage unit 250 stores instructions, programs, and data related to a sound masking method according to one embodiment of the present disclosure.

The controller 260 determines at least one speaker to output sound among the plurality of speakers 230 in the vehicle 20, and generates a sound signal for controlling sound output by the at least one speaker. Here, the sound signal may include at least one of a control signal for a sound pressure level and a control signal for a frequency band.

The controller 260 generates a personalized masking sound of an occupant in the vehicle 20 based on a voice of the occupant, and outputs the masking sound through the speaker 230.

Specifically, the controller 260 identifies one class among a plurality of classes based on the occupant's voice received by the microphone 220. Specifically, the controller 260 identifies a class corresponding to the occupant's voice based on the frequency characteristics of the occupant's voice.

Here, the plurality of classes represent classes classified based on different frequency characteristics. For example, the plurality of classes may include an adult male class, an adult female class, an elderly male class, an elderly female class, a child male class, a child female class, a youth male class, and a youth female class. In addition, the plurality of classes may be divided into classes that may be classified based on frequency characteristics.

According to one embodiment of the present disclosure, the controller 260 may convert the occupant's voice into a time-frequency representation and identify a class corresponding to the time-frequency representation as the one class.

Here, the time-frequency representation indicates a spectrogram or a mel-spectrogram.

The spectrogram has a time axis and a frequency axis, and is a graph or image showing amplitude changes over time and amplitude changes over frequency in color. The spectrogram may be generated from a voice signal in a time domain through algorithms such as Discrete Fourier Transform (DFT), Discrete Cosine Transform (DCT), Short-Time Fourier Transform (STFT), Fast Fourier Transform (FFT), and the like.

A person may better recognize a sound change of a lower frequency than a sound change of a high frequency. The mel-spectrogram is the application of mel-scale to the Fourier transform result in consideration of a person's auditory ability according to frequency.

According to one embodiment of the present disclosure, the controller 260 may identify a class corresponding to a time-frequency representation of an occupant's voice using a classification model, which will be described in detail with reference to FIG. 4A.

Thereafter, the controller 260 acquires reference voice data corresponding to the identified class.

The reference voice data represents voice data depending on the frequency characteristics of the class. Specifically, the reference voice data is data obtained by recording a voice of a person corresponding to each class and storing the recorded voice as a voice signal of a time domain or a time-frequency representation of a voice. For example, a specific sentence or sound spoken by an adult man belonging to the adult male class may be stored as reference voice data.

The controller 260 generates a personalized masking sound of a first occupant by synthesizing white noise with the reference voice data.

The white noise represents noise with a whole and constant spectrum without a certain auditory pattern. The white noise has a constant amplitude across frequency.

However, white noise is an example, and the controller 260 may use different color noise instead of white noise. For example, the controller 260 may synthesize noise suitable for sound masking, such as pink noise, brown noise and the like, with the reference voice data.

The controller 260 controls the speaker 230 to output a personalized masking sound. In order to improve the sound masking performance, the controller 260 may output a personalized masking sound using the speakers disposed close to another occupant requiring sound masking. For example, the controller 260 may output a personalized masking sound using the headrest speaker or the backrest speaker provided in the seat for another occupant.

The controller 260 may concentrate the output on the speaker 230 disposed close to the location of another occupant's head. In addition, the controller 260 may control the speaker 230 such that the personalized masking sound is output to the location of another occupant's head while preventing the personalized masking sound from being output to other regions than the location of another occupant's head. That is, the controller 260 may control the personalized masking sound to be output to another occupant in the form of beam forming.

Specifically, the controller 260 may generate a control signal which causes constructive interference of the sound signal at the location of another occupant's head and deconstructive interference of the sound signal at other regions than the location of another occupant's head. The controller 260 may generate a control signal which, through the constructive interference and the deconstructive interference due to a phase difference, causes the sound signals output from the plurality of speakers 230 to be output to only one region in the vehicle 20 while preventing the output of the sound signals to the other region. In this way, only another occupant can listen to the personalized masking sound.

One occupant does not recognize the other occupant's voice due to the personalized masking sound. That is, the occupant's voice is masked by the personalized masking sound.

Since the frequency characteristics of the occupant's voice are reflected in the personalized masking sound, the personalized masking sound has superior sound masking performance compared to the white noise. Accordingly, it is possible to reduce cognitive or psychological fatigue of another occupant who listens to the personalized masking sound due to the masking sound.

Meanwhile, the controller 260 according to one embodiment of the present disclosure may adjust a magnitude of the personalized masking sound based on a magnitude of the occupant's voice. For example, the controller 260 may adjust the magnitude of the personalized masking sound such that the magnitude of the personalized masking sound becomes smaller than the magnitude of the occupant's voice. Since the sound masking performance is improved when the magnitude of the masking sound is smaller than the magnitude of the voice, the controller 260 may improve the sound masking performance by adjusting the magnitude of the personalized masking sound. In addition, the small magnitude of the personalized masking sound may reduce cognitive or psychological fatigue of another occupant who hears the personalized masking sound due to the masking sound.

Figure 3:
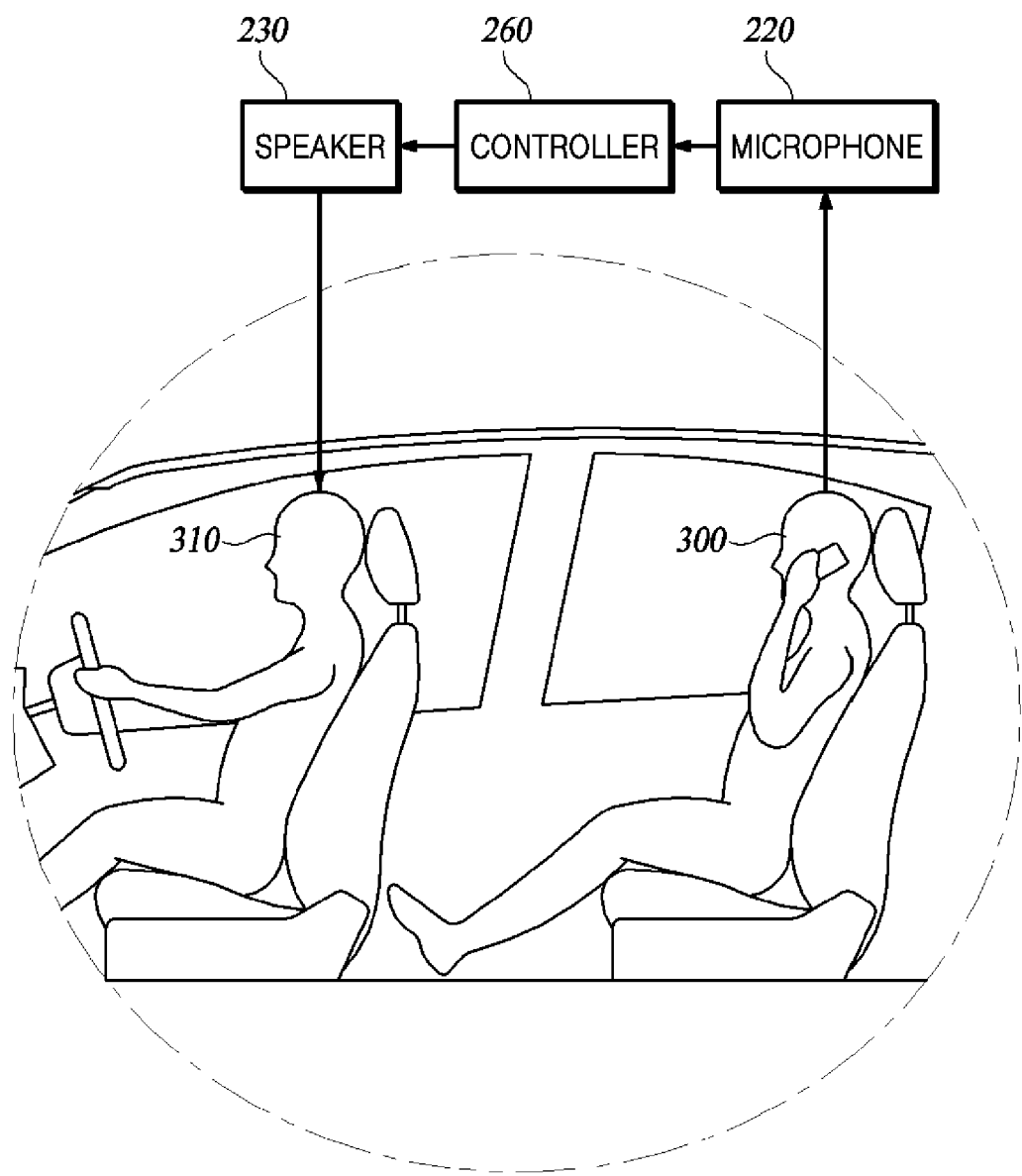
FIG. 3 is a diagram for explaining a sound masking method according to one embodiment of the present disclosure.

FIG. 3 is a diagram for explaining a sound masking method according to one embodiment of the present disclosure.

Referring to FIG. 3, a first occupant 300 and a second occupant 310 are illustrated. The first occupant 300 is described as an adult woman.

The microphone 220 receives a voice of the first occupant 300.

The controller 260 identifies one class among a plurality of classes based on the voice of the first occupant 300. Specifically, the controller 260 converts the voice of the first occupant 300 into a time-frequency representation and identifies the adult female class corresponding to the time-frequency representation of the first occupant 300 among the plurality of classes.

The controller 260 acquires reference voice data stored in advance corresponding to the identified adult female class. Here, the reference voice data is data obtained by recording a specific sentence or sound spoken by an adult woman in advance.

The controller 260 generates a personalized masking sound to a voice of the first occupant 300 by synthesizing white noise with the reference voice data.

The controller 260 outputs the personalized masking sound to the second occupant 310 through the speaker 230. In this case, the controller 260 may output the personalized masking sound using the speakers disposed close to the second occupant 310.

Since the second occupant 310 listens to the personalized masking sound to the voice of the first occupant 300, the second occupant 310 does not recognize surrounding noise and may feel less cognitive or psychological fatigue due to the sound masking.

Figure 4A:
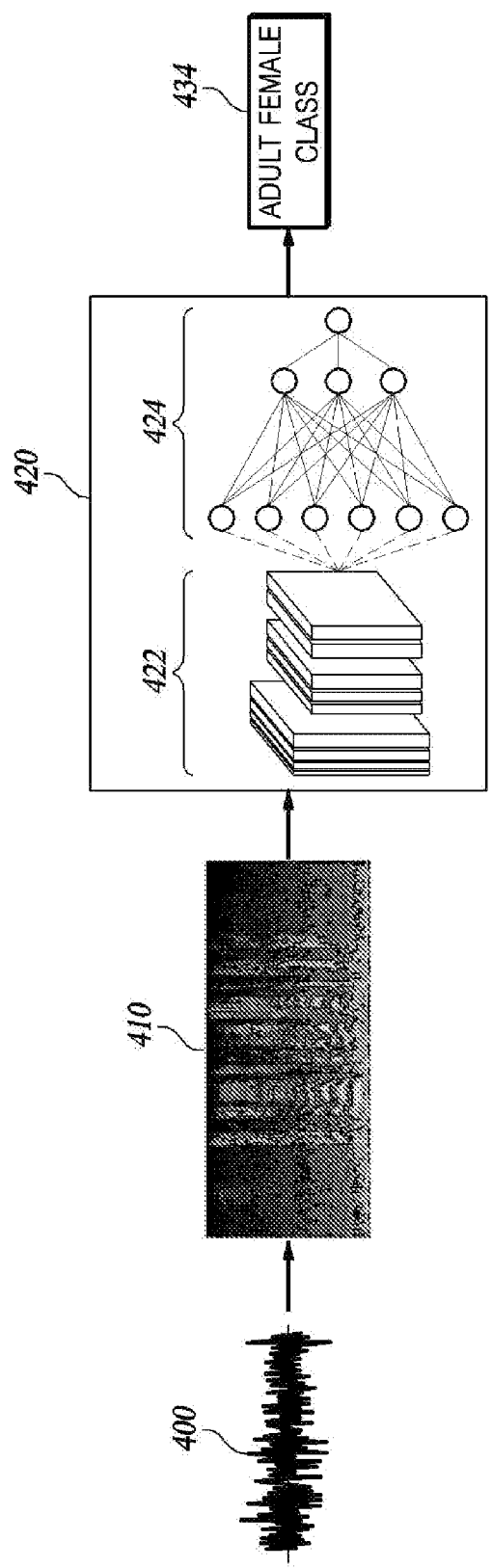
FIG. 4A is a diagram for explaining class identification using a classification model according to one embodiment of the present disclosure.

FIG. 4A is a diagram for explaining class identification using a classification model according to one embodiment of the present disclosure.

Referring to FIG. 4A, a voice signal 400, a time-frequency representation 410, a classification model 420, and an adult female class 434 are illustrated.

According to one embodiment of the present disclosure, the sound masking device may identify a class corresponding to the time-frequency representation 410 of the occupant's voice signal 400 using the classification model 420.

Hereinafter, training and structure of the classification model 420 will be described.

The classification model 420 is trained to classify a class of time-frequency representation of training voice data. Specifically, the classification model 420 receives an input of a time-frequency representation of the training voice data. The classification model 420 extracts features of the input time-frequency representation. The classification model 420 calculates probability values in which the input time-frequency representation would belong to each class according to the extracted feature. The classification model 420 identifies a class of training voice data according to the probability values. The classification model 420 is trained by adjusting weights or biases in the classification model according to the comparison result between the class identification result of the class model 420 and correct answers.

Since the time-frequency representation input to the classification model 420 is a two-dimensional image that is a mel-spectrogram, the classification model 420 may include a convolutional neural network. The convolutional neural network may include at least one convolutional layer 422 and a classifier 424. The convolution layer 422 is a component that extracts features from an input image. The classifier 424 is a component that classifies an input image using features extracted by the convolution layer 422. The classifier may calculate a probability value in which the input image would belong to each class among the plurality of classes, and may identify a class of the input image according to the probability value.

The classification model 420 does not necessarily include the convolutional neural network, and may include various artificial neural networks such as a cyclic neural network and a long short term memory network (LSTM). In this case, the input of the classification model 420 also varies depending on the type of neural network.

Meanwhile, the classification model 420 may be trained by a supervised learning method. Supervised learning refers to a method of training an artificial neural network with a label given for learning data, and the label may refer to an answer or result that the artificial neural network would infer in case that learning data is input to the artificial neural network.

Referring back to FIG. 4A, in order to identify the class of the voice signal 400 of the occupant in the vehicle, the sound masking device converts the voice signal 400 of the occupant in the vehicle into a time-frequency representation 410. In the sound masking device, the voice signal 400 of the occupant may be converted into the time-frequency representation 410 through various Fourier transforms. Here, the time-frequency representation 410 is represented by a mel-spectrogram.

The sound masking device inputs the time-frequency representation 410 to the classification model 420. The classification model 420 extracts frequency characteristics from the time-frequency representation 410, and outputs a class to which the time-frequency representation 410 belongs among the plurality of classes classified depending on the frequency characteristics. The sound masking device may recognize, based on the output of the classification model 420, that the time-frequency representation 410 has frequency characteristics of the adult female class 434. That is, the sound masking device may identify that the voice signal 400 is a voice of an adult woman.

The sound masking device can accurately classify the class of the voice signal 400 using the classification model 420 having been trained through deep learning. In addition, the sound masking device can classify classes for the voice signal 400 which is received in real time.

FIG. 4B is a diagram for explaining a process of generating a personalized masking sound according to one embodiment of the present disclosure.

Referring to FIG. 4B, a class group 430, an adult male class 432, an adult female class 434, an elderly male class 436, a child female class 438, reference voice data 444, white noise 550, and personalized masking sound 460 are illustrated.

The reference voice data 444, the white noise 550, and the personalized masking sound 460 are represented by graphs having a frequency axis and a magnitude axis, but this is an example. Each graph may be represented by a signal or a time-frequency representation having a time domain.

In FIG. 4A, the sound masking device identifies that the voice signal 400 belongs to the adult female class 434.

The sound masking device acquires pre-stored reference voice data 444 corresponding to the identified adult female class 434.

Here, the sound masking device may previously prepare reference voice data corresponding to respective classes in the class group 430. For example, the sound masking device may record a voice obtained by an adult woman speaking a specific sentence or sound and store the recorded voice as reference voice data 444 in advance. In this case, the reference voice data 444 includes the voice of the speaker, and the more the surrounding noise is not included, the better the masking performance may be improved.

The sound masking device generates a personalized masking sound 460 by synthesizing the reference voice data 444 with the white noise 450.

Unlike the white noise 450, the personalized masking sound 460 has frequency characteristics of the reference voice data 444 of the adult female class 434. Accordingly, an occupant who listens to the personalized masking sound 460 does not recognize the voice signal 400, and it is possible to reduce fatigue of the occupant due to the personalized masking sound 460.

Figure 5:
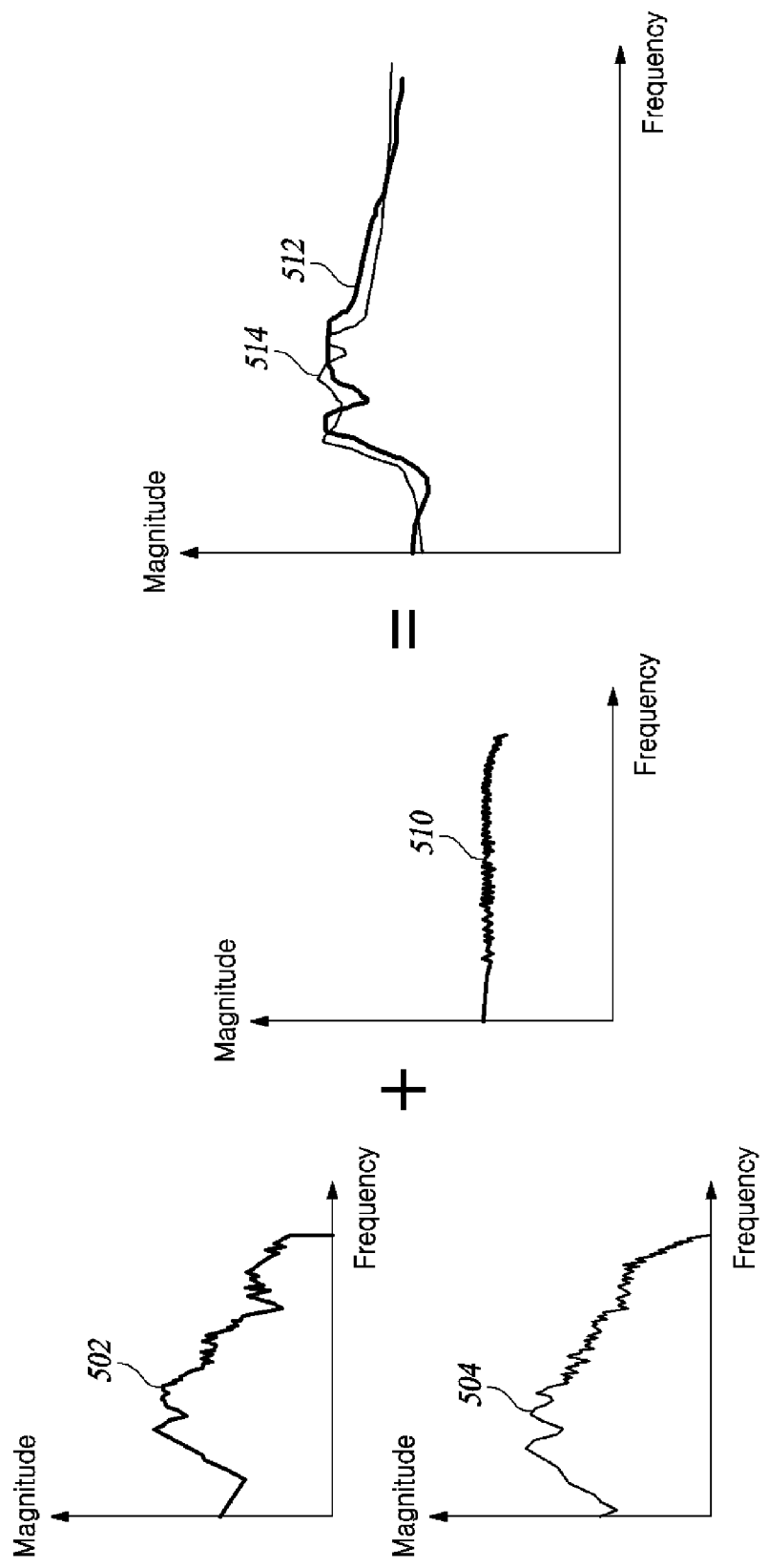
FIG. 5 is a diagram illustrating personalized masking sounds according to one embodiment of the present disclosure.

FIG. 5 is a diagram illustrating personalized masking sounds according to one embodiment of the present disclosure.

Referring to FIG. 5, first reference voice data 502, second reference voice data 504, white noise 510, first personalized masking sound 512 and second personalized masking sound 414 are illustrated.

In FIG. 5, the first reference voice data 502 and the second reference voice data 504 are data corresponding to different classes.

The sound masking device generates the first personalized masking sound 512 by synthesizing the white noise 510 with the first reference voice data 502. The sound masking device generates and outputs the second personalized masking sound 514 by synthesizing the white noise 510 with the second reference voice data 504.

In this way, by outputting a personalized masking sound according to the occupant's voice, the sound masking device may improve the masking performance and reduce the fatigue of the listener.

Meanwhile, in case that there are several occupants in the vehicle, the sound masking device according to another embodiment of the present disclosure may generate and output personalized masking sounds to the respective occupants.

Specifically, when two occupants speak in the vehicle, voice signals of the two occupants may be identified as different classes. The first reference voice data 502 and the second reference voice data 504 may correspond to classes identified based on voice signals of the two occupants.

The sound masking device outputs both the first personalized masking sound 512 and the second personalized masking sound 514 to other occupants than the two occupants. The occupants who listen to the two personalized masking sounds do not recognize the voices of the two occupants.

Figure 6:
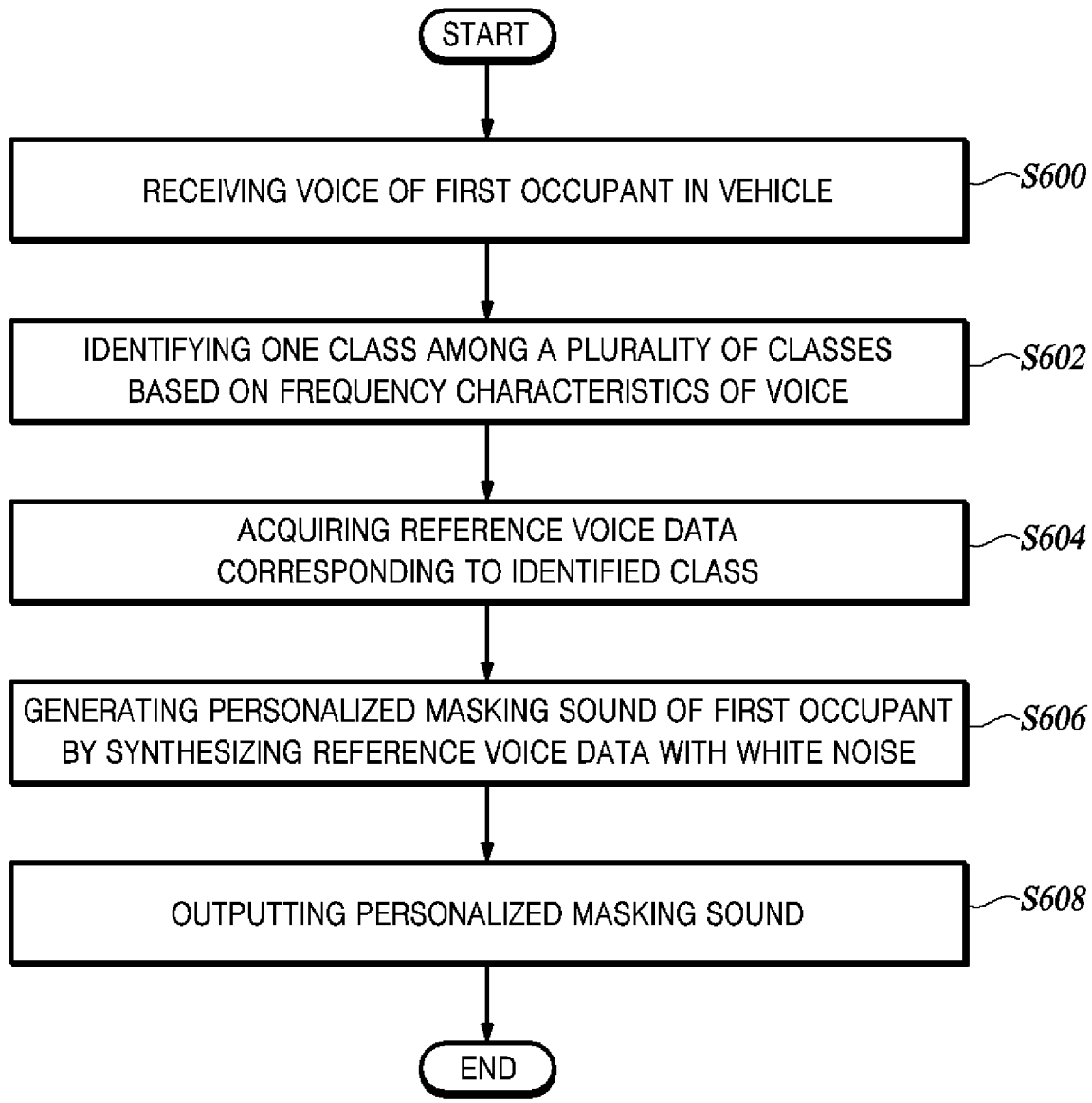
FIG. 6 is a flowchart illustrating a sound masking ethod according to one embodiment of the present disclosure.

FIG. 6 is a flowchart illustrating a sound masking method according to one embodiment of the present disclosure.

Referring to FIG. 6, the sound masking device receives a voice of a first occupant in a vehicle (S600).

The sound masking device identifies one class among a plurality of classes based on the frequency characteristics of the voice (S602).

Here, the plurality of classes are classified based on different frequency characteristics.

According to one embodiment of the present disclosure, the sound masking device can identify a class based on a time-frequency representation of a voice. The time-frequency representation is either a spectrogram or a mel-spectrogram. Specifically, the sound masking device acquires the time-frequency representation of the voice. The sound masking device may identify the class corresponding to the time-frequency representation among the plurality of classes.

In this case, the sound masking device may identify a class using a classification model including an artificial neural network. The sound masking device inputs a time-frequency representation into a classification model which has been trained to classify a class of time-frequency representation of training voice data. The sound masking device may identify a class corresponding to the time-frequency representation of the voice based on the output of the classification model. The classification model may include a convolutional neural network as the artificial neural network.

The sound masking device acquires reference voice data corresponding to the identified class (S604).

The sound masking device generates a personalized masking sound of the first occupant by synthesizing the reference voice data with white noise (S606).

The sound masking device outputs the personalized masking sound (S608).

According to one embodiment of the present disclosure, the sound masking device may adjust the magnitude of the personalized masking sound based on the magnitude of the voice.

According to one embodiment of the present disclosure, the sound masking device may control at least one speaker such that the personalized masking sound is intensively output to the second occupant. To this end, the sound masking device may output a personalized masking sound using the speaker close to the second occupant. In addition, the sound masking device may output the personalized masking sound to reach only the second occupant through the use of beam forming.

As described above, according to one embodiment of the present disclosure, by classifying the voices of the occupants in the vehicle depending on frequency characteristics, and generating and outputting a personalized masking sound to the voice of an occupant, cognitive or psychological fatigue which other occupants feel due to the sound masking can be reduced.

According to another embodiment of the present disclosure, it is possible to improve the performance of sound masking by classifying voices of occupants in a vehicle depending on frequency characteristics, and generating and outputting a personalized masking sound to an occupant's voice.

According to another embodiment of the present disclosure, it is possible to prevent an inaccurate masking sound from being output by accurately classifying the voices of the occupants using an artificial neural network when the voices of the occupants are input in real time.

Various implementations of the systems and techniques described herein may include digital electronic circuits, integrated circuits, field programmable gate arrays (FPGAs), application specific integrated circuits (ASICs), computer hardware, firmware, software, and/or a combination thereof. These various implementations may include an implementation using one or more computer programs executable on a programmable system. The programmable system includes at least one programmable processor (which may be a special purpose processor or a general-purpose processor) coupled to receive and transmit data and instructions from and to a storage system, at least one input device, and at least one output device. Computer programs (also known as programs, software, software applications or codes) contain instructions for a programmable processor and are stored in a "computer-readable recording medium".

The computer-readable recording medium includes all types of recording devices in which data readable by a computer system are stored. The computer-readable recording medium may include non-volatile or non-transitory, such as ROM, CD-ROM, magnetic tape, floppy disk, memory card, hard disk, magneto-optical disk, and storage device, and may further include a transitory medium such as a data transmission medium. In addition, the computer-readable recording medium may be distributed in a network-connected computer system, and the computer-readable codes may be stored and executed in a distributed manner.

Although it is described that each process is sequentially executed in the flowchart/timing diagram of the present specification, this is merely illustrative of the technical idea of one embodiment of the present disclosure. In other words, since an ordinary skilled person in the art to which thee embodiments of the present disclosure pertain may make various modifications and changes by changing the order described in the flowchart/timing diagram without departing from the essential characteristics of the present disclosure or performing in parallel one or more of the steps, the flowchart/timing diagram is not limited to a time-series order.

Although embodiments of the present disclosure have been described for illustrative purposes, those having ordinary skill in the art should appreciate that various modifications, additions, and substitutions are possible, without departing from the idea and scope of the present disclosure. Therefore, embodiments of the present disclosure have been described for the sake of brevity and clarity. The scope of the technical idea of the present embodiments is not limited by the illustrations. Accordingly, those having ordinary skill should understand the scope of the present disclosure should not be limited by the above explicitly described embodiments but by the claims and equivalents thereof

What is claimed is:

1. A computer-implemented method for sound masking, the method comprising:
    identifying, by a controller, one class among a plurality of classes based on frequency characteristics of a voice of a first occupant in a vehicle;
    obtaining, by the controller, reference voice data corresponding to the identified class;
    generating, by the controller, a personalized masking sound for the first occupant by synthesizing the reference voice data with white noise; and
    controlling, by the controller, an output of the personalized masking sound.

2. The method of claim 1, wherein the plurality of classes are classified based on different frequency characteristics.

3. The method of claim 1, wherein the identifying of the one class among the plurality of classes comprises:
    acquiring, by the controller, a time-frequency representation of the voice; and
    identifying, by the controller, a class corresponding to the time-frequency representation among the plurality of classes as the one class.

4. The method of claim 3, wherein the identifying of the class corresponding to the time-frequency representation comprises:
    inputting, by the controller, the time-frequency representation into a classification model having been trained to classify a class of time-frequency representation of training voice data; and
    identifying, by the controller, the class corresponding to the time-frequency representation of the voice based on an output of the classification model.

5. The method of claim 4, wherein the classification model includes a convolutional neural network.

6. The method of claim 3, wherein the time-frequency representation is either a spectrogram or a mel-spectrogram.

7. The method of claim 1, wherein the controlling of the output of the personalized masking sound comprises:
    adjusting, by the controller, a magnitude of the personalized masking sound based on a magnitude of the voice.

8. The method of claim 1, wherein the controlling of the output of the personalized masking sound comprises:
    controlling, by the controller, at least one speaker such that the personalized masking sound is output to a second occupant.

9. A sound masking device comprising:
    a microphone configured to receive a voice of a first occupant in a vehicle;
    at least one speaker disposed in the vehicle; and
    a controller configured to identify one class among a plurality of classes based on frequency characteristics of the voice, obtain reference voice data corresponding to the identified class, generate a personalized masking sound for the first occupant by synthesizing the reference voice data with white noise, and control the at least one speaker to output the personalized masking sound.

10. The sound masking device of claim 9, wherein the plurality of classes are classified based on different frequency characteristics.

11. The sound masking device of claim 9, wherein the controller is further configured to:
    acquire a time-frequency representation of the voice; and
    identify a class corresponding to the time-frequency representation among the plurality of classes as the one class.

12. The sound masking device of claim 11, wherein the controller is further configured to:
    input the time-frequency representation to a classification model having been trained to classify a class of time-frequency representation of training voice data; and
    identify the class corresponding to the time-frequency representation of the voice based on an output of the classification model.

13. The sound masking device of claim 12, wherein the classification model includes a convolutional neural network.

14. The sound masking device of claim 9, wherein the controller is configured to adjust a magnitude of the personalized masking sound based on a magnitude of the voice.

15. The sound masking device of claim 9, wherein the controller is configured to control the at least one speaker to output the personalized masking sound to a second occupant.

* * * * *